March 11, 1924.  1,486,115

R. C. ALLEN

BALANCING MACHINE BEARING

Filed Jan. 3, 1921   2 Sheets-Sheet 1

Robert C. Allen
INVENTOR

BY D. C. Davis
ATTORNEY

March 11, 1924.

R. C. ALLEN

BALANCING MACHINE BEARING

Filed Jan. 3, 1921    2 Sheets-Sheet 2

Robert C. Allen
INVENTOR

BY
ATTORNEY

Patented Mar. 11, 1924.

1,486,115

UNITED STATES PATENT OFFICE.

ROBERT C. ALLEN, OF ESSINGTON, PENNSYLVANIA, ASSIGNOR TO WESTINGHOUSE ELECTRIC AND MANUFACTURING COMPANY, A CORPORATION OF PENNSYLVANIA.

BALANCING-MACHINE BEARING.

Application filed January 3, 1921. Serial No. 434,604.

*To all whom it may concern:*

Be it known that I, ROBERT C. ALLEN, a citizen of the United States, and a resident of Essington, in the county of Delaware and State of Pennsylvania, have invented a new and useful Improvement in Balancing-Machine Bearings, of which the following is a specification.

This invention relates to balancing machines, and has for its object to provide, in apparatus of the character designated, an improved bearing which shall render possible a smoother operation of the machine and consequently more accurate and expeditious balancing of rotary bodies.

In balancing machines, for the determination of static and dynamic balance of rotary bodies, it is customary to support the body upon trunnions which are adapted to rotate in bearings carried by members of the machine, the reversing horizontal component of the centrifugal force of the unbalanced masses in the body, when rotated, operating to vibrate flexible members and thereby give indications by which the amount and location of the unbalanced masses may be determined. The bearing supporting members are ordinarily capable of a single degree of freedom of motion so that the manifestation of the unbalanced condition may be confined to a single plane or path of movement and therefore the location of the overbalancing mass may be readily determined. In a machine of this kind, especially when used in connection with very heavy bodies, difficulty has been experienced in developing a satisfactory bearing. Smooth bearings have been used but in these the pressure is concentrated on a limited portion of the bearing; and, in view thereof and of the necessary clearance, high-frequency vibrations are liable to be set up which render difficult the reading of the indicator, and the great amount of friction requires a heavy driving mechanism which, in turn, tends to give false indications of the unbalance of the body. If supporting rollers are employed, they may possibly become worn or may become askew and wear the journal unevenly or there may be a possibility of the journal in the first place being not strictly true. These and other causes have rendered it difficult to interpret with certainty the indications of a balancing machine, especially when used in connection with rotary bodies of great mass, such as gyroscopic stabilizer rotors and the rotors of large steam turbines. Accordingly, I have discovered that if a bearing of the well-known wedge film or Kingsbury type is applied, the difficulties mentioned are overcome. It is characteristic of this type of bearing that, due to the capacity of the segmental shoe or shoes thereof to rock and co-operate with the other bearing member to form a load-sustaining, wedge-shaped oil film, the load is more or less uniformly distributed throughout the face of the bearing shoe and consequently its capacity for carrying loads is much increased. A wedge-film type of bearing, therefore, will contact with a substantial portion of the circumference of the trunnion or journal and consequently any inaccuracies or inequalities will be averaged. Also, due to the characteristic of this bearing of supporting a much larger load than the ordinary bearing, it is possible to utilize a bearing of this type which is relatively much smaller than the ordinary type. Another important advantage due to the use of the wedge-film type of bearing is the low coefficient of friction of the latter. Accordingly, a balancing machine equipped with a bearing of this kind may be operated by a small driving member and it would, therefore, be accompanied by a smaller disturbance due to possible unbalanced condition of the driving member.

Apparatus embodying features of my invention is illustrated in the accompanying drawings, forming a part of this application, in which, Fig. 1 is an end view of a balancing machine, partially in section, showing my improvement applied thereto;

Figure 1:
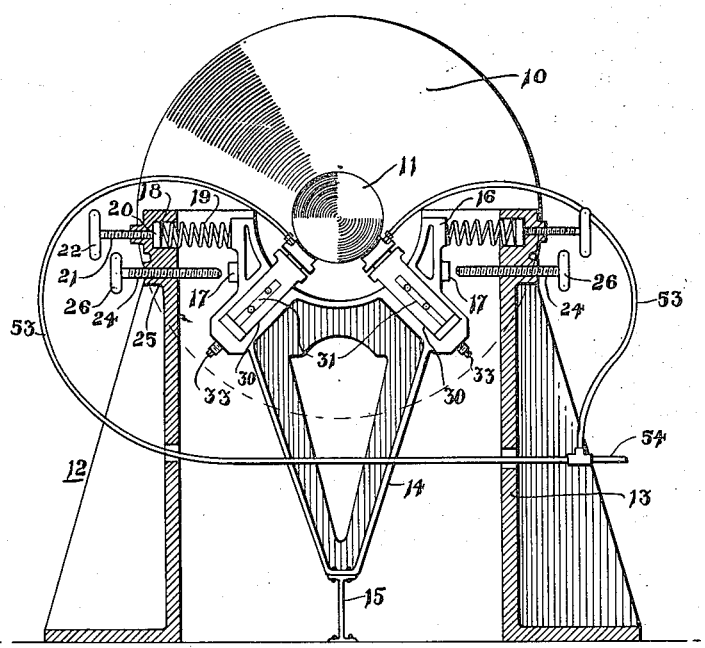
Figure 3:
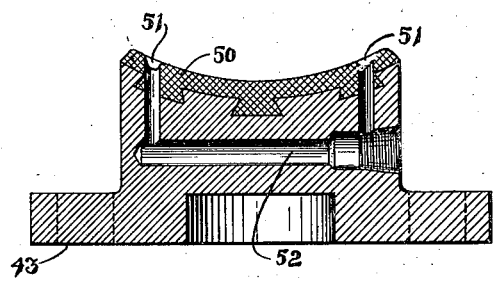
Fig. 3 is a sectional view of one of the bearing shoes.

In Fig. 1, I show a rotor 10 to be balanced which is provided with a trunnion 11 supported by the bearing of a balancing machine 12. The opposite end of the rotor 10 is provided with a like trunnion or journal which is supported by a similar balancing machine.

The balancing machine 12 comprises a frame or casing 13 to which is secured a pendulum support member 14 by means of a flexible I-beam 15 (equivalent of a knife edge). The upper end of the pendulum support member 14 is enlarged and carries the bearings, hereinafter more particularly referred to, and it is preferably provided at its sides with seats 16 and 17. The casing or frame 13, at each side of the pendulum support member 14, is provided with a spring retaining chamber 18, containing a spring 19 normally bearing against a seat 16. Varying degrees of compression of the springs are effected by followers 20 carried by screw-threaded stems 21 fitting within screw threaded openings in the ends of the chambers. The stems 21 are provided with hand wheels 22. Screws 24 fit within screw-threaded openings 25, in the casing or frame 13 and they are adapted, at times, to cooperate with the seats 17 of the pendulum support member for the purpose of maintaining the latter in a fixed position, the screws being provided with hand wheels 26 whereby they may be adjusted.

The pendulum support member 14 is provided with guideways 30 in which are slidably fitted support members 31, preferably disposed at about 45 degrees to the vertical. The pendulum support member is provided with adjusting screws 33 adapted to cooperate with the support members 31 to adjust the latter longitudinally of the guides, spacing blocks 32 preferably being provided for interposition between the screws and support members. Bolts 34, passing through slots 34' in the members 31, serve to secure the latter in position with respect to the pendulum member.

Each support member 31 is provided at its upper end with a bearing member 35 having a wear plate 36 carried by a projection 37 thereof. A segmental shoe 38, provided with a recess 39, fits about the projection 37 and it is provided interiorly thereof with a spherical bearing seat 40 adapted to bear on the plate 36. Screws 41, provided with collars 42, secure the bearing member 35 in place with reference to the support member 31. The screws extend upwardly and fit loosely within openings 43 provided in the projections 44 of the segmental shoe; and, above the projections, cotter pins 45 pass through the screws for the purpose of retaining the segmental shoe in assembled relation.

It will be seen from the drawing, and it is obviously necessary, in order to provide for a rocking motion of the segmental shoes, that adequate clearance should be provided between the recess 39 and the projection 37 as well as between the shoes 38 and the bolts 41. In normal operation, the segmental shoes will rock about axes substantially parallel to the axis of the journal; however, they are obviously capable of universal rocking movement.

Each of the shoes 38 is preferably provided with a babbitt facing 50 having longitudinal grooves 51 terminating short of the ends of the babbitt facing and communicating with an oil passage 52. Oil is supplied to the passage by means of a flexible conduit 53 communicating in any desired manner with the passage 52. Normally, oil is supplied under pressure, as from 200 to 400 pounds per square inch, depending upon the mass of the element to be balanced.

In the drawings, I have shown two segmental bearing shoes cooperating with the lower face of the journal member 11, and conduits 53 supply oil to the oil passages of the shoes, the conduits being connected to a common supply conduit 54. Any appropriate oiling system may be associated with the bearings which is capable of recovering escaping oil and developing the required pressure for the supply conduits.

From the construction shown, it will be apparent that the segmental shoes are readily removable from the supporting elements 31. Consequently, if the trunnions or journals of the bodies to be balanced should vary in diameter, it would only be necessary to carry in stock several shoes of different radii of curvature. Suitable shoes are selected and placed on the support members 31, after which the latter are adjusted in order to properly cooperate with the trunnion or journal portion of the body to be balanced.

The operation of my device is as follows: The body 10 to be balanced, having trunnions 11, is placed in position on the segmental shoes 38, the screws 24 having been adjusted to hold the pendulum member 14 in a rigid position. Oil under pressure is then supplied to the passageways in the shoes, after which the body to be balanced is rotated. After a desired speed has been attained, the screws 24 are retracted in the usual way, the screws 21 having been adjusted to obtain sufficient compression of the springs 19 for the purpose of obtaining the resulting natural frequency of the vibrating member.

It is to be understood that the balancing machines are so operated as to obtain indications at one end at a time, the machine under observation having the screws 26 retracted in order to allow the pendulum 14 to swing while the pendulum of the other machine is maintained in fixed position by its screws 26.

Immediately upon initiation of rotation of the journal member 11, the shoes 38 rock in order to provide a wedge-shaped film between each of the shoes and the journal member or trunnion. If the journal 11 rotates in a clockwise direction, the right hand shoe 38 tilts about its seat so as to provide a circumferentially extending wedge-shaped film which has its greatest thickness at the side of approach.

Figure 4:
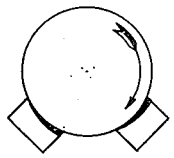
Fig. 4 is a diagrammatic view illustrating the wedge-film formation.
Figure 2:
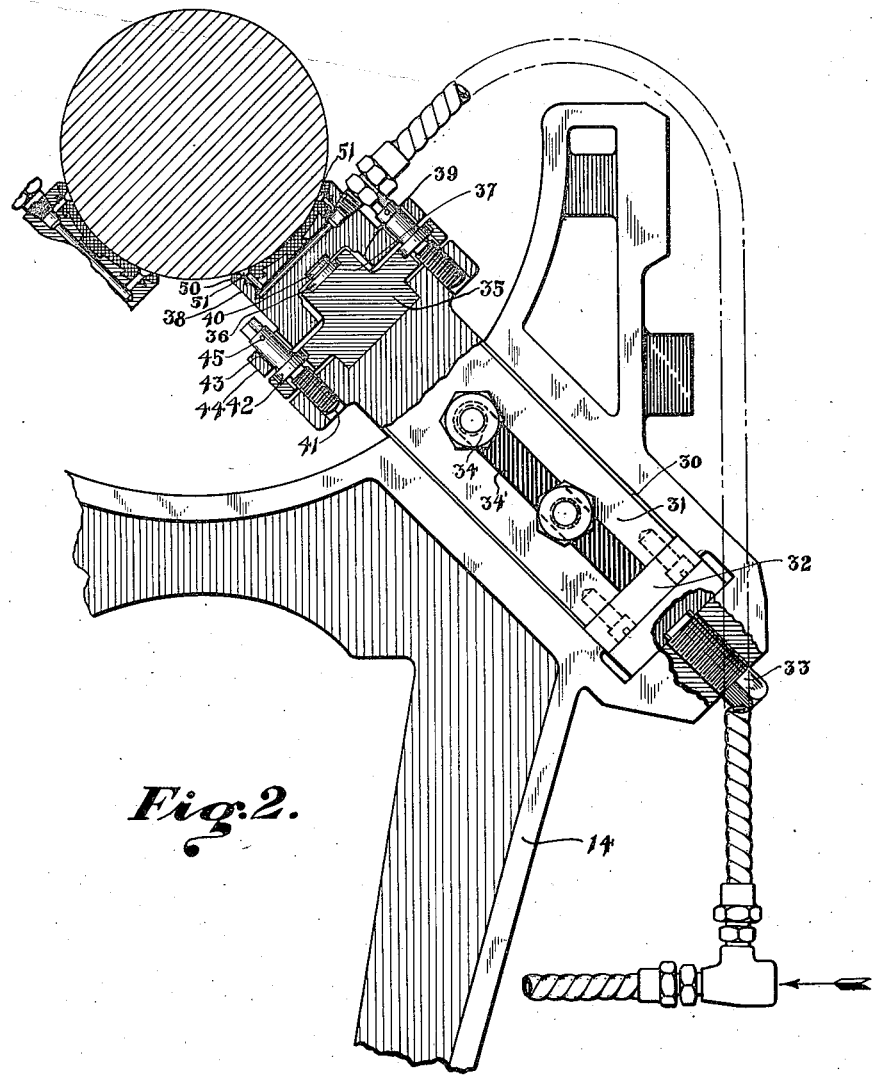
Fig. 2 is a detail view showing the bearing in section.

The formation of the oil film will be better understood upon reference to the exaggerated and diagrammatic views, Fig. 4. It is a well known fact that a bearing of this type, commonly known as a Kingsbury bearing, is capable, for the same size, of supporting many times the load of an ordinary bearing of the same nominal size for the reason that the bearing pressure is distributed over the wedge film.

The pendulum support member 14 vibrates back and forth and, due to my improved bearing, the vibrations may be read on an appropriate indicator, not shown, without being affected by a secondary or high frequency vibration or tremor, resulting from inequalities necessarily present in bearings heretofore used, which render the determination of the indications very difficult, especially when used with very heavy rotors.

Any desired mechanical means may be resorted to in order to correctly balance the rotor in accordance with the indications. Material may be removed at desired places or the rotor might previously be provided with holes and necessary fillings inserted to secure the proper balance.

After one end of the body is balanced, the other end of the machine may be operated in the same way and the corresponding end of the body balanced. With the two ends corrected in this way, calculations may then be made to determine the size and location of the final balance weights, after that the rotary body will be in dynamic and static balance, that is to say, the axis of rotation will coincide with the axis of mass at any speed of rotation.

From the foregoing, it will be seen that I have developed an improved balancing machine which is not subject to the undesirable effects of secondary high-frequency vibrations which render difficult the determination of the extent of unbalance. In other words, my bearing is of such a nature that minute irregularities therein are averaged, that is to say, the running radius of the journal is the average of a substantial portion of the cylinder in contact with the shoes. Consequently, the errors are practically negligible and only the primary vibrations, namely, those of the pendulum member 14, are indicated.

While I have shown my invention in but one form, it will be obvious to those skilled in the art that it is not limited, but is susceptible of various other changes and modifications, without departing from the spirit thereof, and I desire therefore, that only such limitations shall be placed thereupon as are imposed by the prior art or as are specifically set forth in the appended claims.

What I claim is:

1. In a balancing machine, the combination of an element limited to one degree of freedom of motion, a supporting bearing carried by the element for supporting the body to be balanced including a plurality of rocker segments having bearing faces adapted to co-operate with the journal portion of a body to be balanced, and means for supplying oil to the faces of the segments, the segments adapted to rock upon rotation of the body, whereby circumferentially-extending, load-sustaining wedge-shaped oil films are formed between the journal portion of the body and the bearing faces.

2. In a balancing machine, the combination of a vibratory member and a bearing on the vibratory member which is open at the top, whereby a body may be readily removed or placed in position, and which consists of a pair of tiltably-mounted segmental shoes with means for supplying oil thereto.

3. In a balancing machine, the combination of a pendulum member having a single degree of freedom of movement, a bearing portion at the top of the pendulum member open at the top, whereby an element to be balanced may be readily removed and placed in position, and segmental bearing shoes carried by the pendulum member and capable of rocking motion, whereby wedge-shaped, load-sustaining oil films may be formed between the bearing portions thereof and the bearing portion of the supported element.

4. In a balancing machine, the combination of a pendulum member having a single degree of freedom of movement, a single pair of segmental bearing shoes carried by the pendulum member, for supporting a body to be balanced, means whereby the shoes may tilt in all directions, means for adjusting the position of the shoes, and means for supplying oil under pressure to the bearing faces of the shoes.

5. In a balancing machine, the combination of a pendulum support member having a single degree of freedom of motion, an open-topped bearing carried at the upper end of the pendulum support member, the upper portion of the pendulum support member being provided with converging guideways, support members in the guideways, adjusting screws carried by pendulum support member, spacing blocks in the guideways between adjusting screws and the support members, segmental shoes carried by the upper ends of the support members, universal rocker bearings between the segmental shoes and the support members, and means for supplying oil under pressure to the bearing faces of the segmental shoes.

6. In a balancing machine, the combination of a pendulum support member having a single degree of freedom of motion, an open-topped bearing carried at the upper end of the pendulum support member, the upper portion of the pendulum support member being provided with converging guideways, supports in the guideways, adjusting means carried by pendulum support member for controlling the position of the supports, segmental shoes carried by the upper ends of the supports, universal rocker bearings between the segmental shoes and the supports, and means for supplying oil under pressure to the bearing faces of the segmental shoes.

7. In a balancing machine, the combination of a vibratory member, adjustable supports carried by the vibratory member and which are inclined with respect to each other, segmental shoes carried by the supports, rocker bearings between the segmental shoes and the supports, and means for supplying oil to the shoes.

8. In a balancing machine, the combination of a pendulum support member, a flexible I-beam for supporting a pendulum support member, adjustable supports carried by the pendulum member and disposed at substantially 45° to the vertical, segmental shoes carried by the supports, universal rocker bearings between the segmental shoes and the supports, and means for supplying oil under pressure to the bearing faces of the segmental shoes.

9. A balancing machine comprising a frame or casing, a pendulum support member within the casing, a flexible I-beam member supporting the lower end of the pendulum member, adjusting screws carried by the casing or frame and at times adapted to cooperate with the upper portion of the pendulum member to hold the latter in a rigid position, adjustable spring members interposed between the casing or frame member and the pendulum member, segmental load-sustaining shoes carried by the pendulum member, a universal rocker bearing between each of the segmental shoes and the pendulum member, and means for supplying oil under pressure to the bearing faces of the shoes whereby, upon rotation of the rotary body to be balanced, the shoes will be tilted and load-sustaining, wedge-shaped oil films will be formed between the rotary element and each of the segmental shoes.

10. In a machine for rotating a body without imparting vibrations thereto other than those due to the body itself, the combination of a vibratory member, a pair of tiltably-mounted segmental shoes carried by the member for supporting the body, and means for supplying oil to the shoes.

11. In a machine for rotating a body without imparting vibrations thereto other than those due to the body itself, the combination of a vibratory member, a pair of guides carried by the vibratory member, adjustable supports in the guides, tiltably-mounted segmental shoes carried by the supports, and means for supplying oil to the shoes.

In testimony whereof, I have hereunto subscribed my name this 29th day of December, 1920.

ROBERT C. ALLEN.